AUXILIARY-SERVICE TELEPHONE SYSTEM

Filed Nov. 1, 1951 5 Sheets-Sheet 1

INVENTOR
RICHARD P. BOYER, JR.
BY John I. Bellamy
ATTORNEY

INVENTOR
RICHARD P. BOYER, JR.
BY John J. Bellamy
ATTORNEY

Sept. 20, 1955 R. P. BOYER, JR 2,718,557

AUXILIARY-SERVICE TELEPHONE SYSTEM

Filed Nov. 1, 1951 5 Sheets-Sheet 3

INVENTOR
RICHARD P. BOYER, JR.
BY John G. Bellamy
ATTORNEY

Sept. 20, 1955 R. P. BOYER, JR 2,718,557

AUXILIARY-SERVICE TELEPHONE SYSTEM

Filed Nov. 1, 1951 5 Sheets-Sheet 4

INVENTOR
RICHARD P. BOYER, JR.
BY John J. Bellamy
ATTORNEY

Sept. 20, 1955 R. P. BOYER, JR 2,718,557

AUXILIARY-SERVICE TELEPHONE SYSTEM

Filed Nov. 1, 1951 5 Sheets-Sheet 5

INVENTOR
RICHARD P. BOYER, JR.
BY John J. Bellamy
ATTORNEY

United States Patent Office 2,718,557

Patented Sept. 20, 1955

2,718,557

AUXILIARY-SERVICE TELEPHONE SYSTEM

Richard P. Boyer, Jr., La Grange, Ill., assignor, by mesne assignments, to International Telephone and Telegraph Corporation, a corporation of Maryland Application November 1, 1951, Serial No. 254,315

5 Claims. (Cl. 179—27)

This invention relates to an auxiliary-service telephone system. Its main object is to provide a more satisfactory system for providing auxiliary, or special, services such as (1) intercepting calls to disconnected lines or stations and (2) holding annoyance-call connections until the calling line can be ascertained.

One specific object of the invention is to provide an efficient and economical arrangement for insuring that, when a call is intercepted (diverted from the called line or station to a line or trunk leading to an intercept operator), the answering of the call by the intercept operator does not cause the usual answered supervision to be relayed back toward the calling line, whereby the calling subscriber is not charged for the intercepted call.

A further specific object is to provide an economical and efficient arrangement for furnishing call-holding service to certain lines, such as those which are likely to receive, or have been receiving, annoyance calls; that is, frivolous or mischievous calls from persons unidentified.

I. GENERAL DESCRIPTION

In public-exchange telephone systems, it is common practice to provide temporary facilities enabling an operator to intercept and answer calls made to lines or to party-line stations whereat the service has been discontinued or whose numbers have been changed.

Since an intercepted call has not been completed to the line or station which was called, no charge therefor should be made in those systems wherein calls are charged for on an individual basis. But, the omission of a charge for intercepted calls poses a problem in automatic telephone systems containing apparatus for automatically assessing a separate unit charge for each completed local call.

In many automatic (or dial) telephone systems, the operation of the so-called back-bridge relay when the call is answered gives answered supervision to the calling line, as by reversing the current flow thereover, and the charging apparatus responds to the answered supervision to assess a unit charge. In such systems various expedients have been used to prevent the back-bridge relay from being operated effectively by the answering of the intercept operator, such as providing a closure of a ring-trip bridge across the intercept trunk either through a resistance too high to operate the back-bridge relay, or by effecting a momentary closure of the ring-trip bridge for an interval sufficient to insure the tripping of the ringing operation, but insufficient to permit an effective operation of the back-bridge relay. These current-marginal or time-marginal arrangements for preventing the giving of answered supervision as a result of the answering of intercepted calls are subject to erroneous operation because of the rather critical relay adjustments they require.

In the light of the foregoing, the first stated specific object of the invention may be restated as being to provide a new and improved circuit arrangement for selectively disabling the trunk-associated coupling apparatus through which a call is completed from giving answered supervision when the call therethrough is intercepted.

It is a feature of the disclosed embodiment of the invention that the foregoing object is attained by imparting a differentiated intercept condition to the concerned coupling apparatus incidental to the operation of the common controlling apparatus which causes the call to be diverted to the intercept operator, in which intercept condition the apparatus is incapable of giving answered supervision.

Referring to the said further object, relating to call-holding service, it is common practice in many dial systems to maintain the forward sleeve wire of a connection to a called line separate from the rearward sleeve wire, thus enabling the two ends of the connection to be cleared out independently, as well as reducing the number of holding magnets attached to a single sleeve wire. This practice, however, interferes with providing call-holding service, through which annoyance-call connections may be locked in under the control of the called line until the connection may be traced to the calling line. A feature of the invention is that any coupling apparatus through which a call is made is automatically conditioned to provide call-holding service, depending upon the called line currently having call-holding service assigned thereto.

A special feature of the invention is that the same relay is used in the coupling apparatus to condition it for call-holding service as is used to render it incapable of giving answered supervision on intercepted calls.

It has been chosen to illustrate the invention as applied to a primary-secondary-spread crossbar telephone system of the type illustrated in the co-pending application of Bellamy and Bowser, Serial No. 85,292, filed April 4, 1949, hereinafter referred to as the former application.

In the said former application, primary-secondary-spread crossbar switching apparatus is disclosed constituting a 1000-line, forty-trunk exchange, wherein the lines are served by four line-link frames of 250 lines, and the line-link frames are served in common by a block-link frame through which all calls are completed.

The usual trunk-associated coupling apparatus is contained in so-called block couplers which are mounted on the block-link frame, one such coupler for each originating or incoming trunk. The arrangement is such that a call for a local line, on arriving at a block coupler either from a local line or from a trunk, progresses no further until the complete telephone number has been dialed. The final completion of the connection is thereupon accomplished through the crossbar switching apparatus under the control of common controlling apparatus, which includes a block controller and a block translator, assisted by line-controller apparatus on the called line-link frame. For this purpose, the block coupler on which the call is waiting is rendered temporarily individual to the block controller and block translator. It has been discovered that relatively minor revisions in the circuits interconnecting the named items serve to enable the temporarily individualized block coupler to be conditioned as desired for intercepting service or for call-holding service under the control of the block translator by virtue of its taking on a different numerical setting for each telephone number called.

In the disclosed preferred embodiment of the invention, the switch-through relay, which is employed for calls outgoing to trunk and for reverting calls, is conditioned to operate upon the completion of the connection to a local line on call-hold service or to an intercept line or trunk, to thereby extend the tip, ring, and sleeve conductors metallically through the block coupler to the called location. The block coupler is thereby deprived of its ability to relay answered supervision back to the charging apparatus which may be associated with the calling line, and a suitable line circuit associated with the called line is enabled to hold the entire connection over the extended sleeve.

Other objects and features of the invention will become apparent as the description progresses.

II. THE DRAWINGS

Referring now to the accompanying drawings comprising Figures 1 to 7, they show sufficient of the apparatus in a telephone system embodying the invention to enable the invention to be understood. Figures 1 to 6 are circuit drawings, while Figure 7 shows how the sheets on which Figures 1 to 6 are drawn should be arranged to be understood best.

Figures 1 to 5 show a call-through circuit diagram of the path of an intercepted call.

Figures 1 to 6 show a call-through circuit diagram of the path of a call to a line provided with call-hold service.

Figure 1:
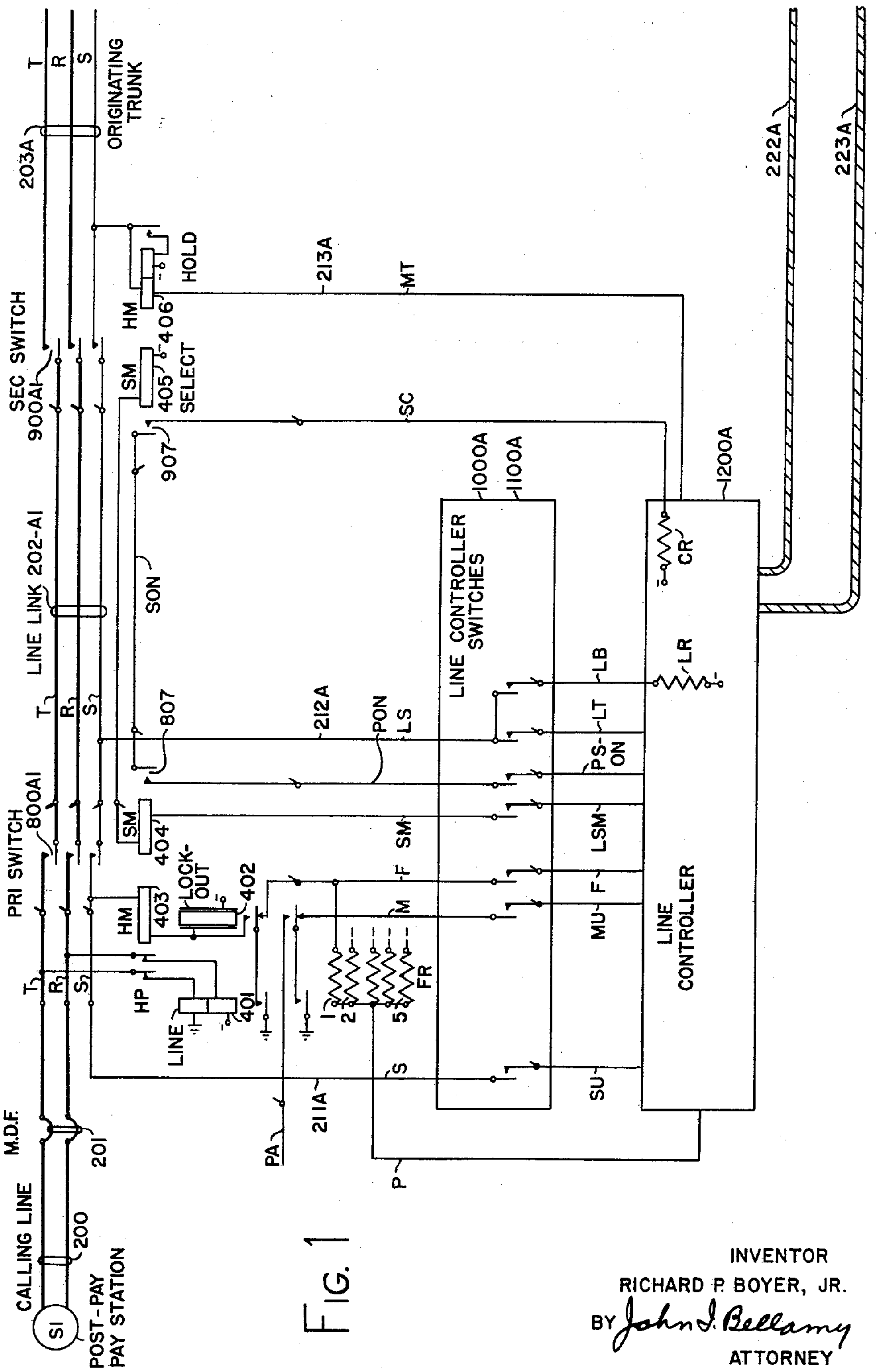
Figures 1 to 4 show a call-through circuit diagram of the path of a call from a local line to an outgoing trunk or to another local line.

Figure 1 shows certain apparatus at line-link frame A of the system of the former application. The illustrated apparatus includes primary and secondary line-link switches 800–A1 and 900–A1 for extending connections to and from lines such as 200, by way of two-way line links such as 202–A1. The connections from the lines are by way of originating trunks such as 203A, while the connections to the lines are by way of terminating trunks (not shown in Figure 1) such as 207A of Figures 3 and 4. Figure 1 also shows the line equipment (items 401 to 403) serving line 200, together with rectangles indicative of line-controller switches 1000A and 1100A, and line controller 1200A.

Figure 2:
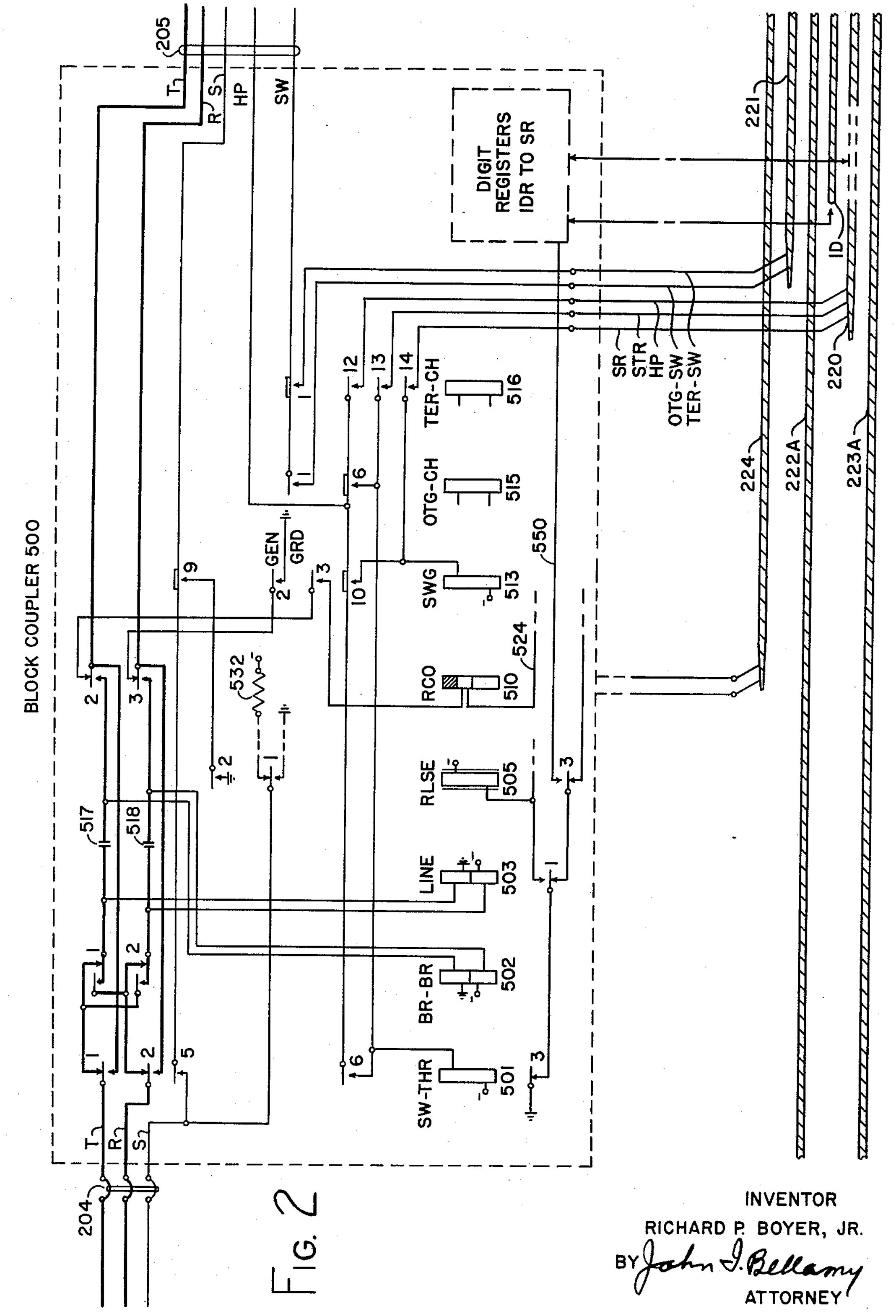

Figure 2 is a partial circuit diagram of block coupler 500, on the block-link frame, being similar to block coupler 500L of the former application, but modified, in certain illustrated circuit details, in accordance with the invention. Block coupler 500 serves originating trunk 203A of Figure 1 by way of three-wire jumper 204, and is connected with the switching apparatus of Figure 3 by way of forward conductors 205. It is also associated with the common controllers of Figure 3 by way of conductors in cables 224, 221, ID, and 220.

Figure 3:
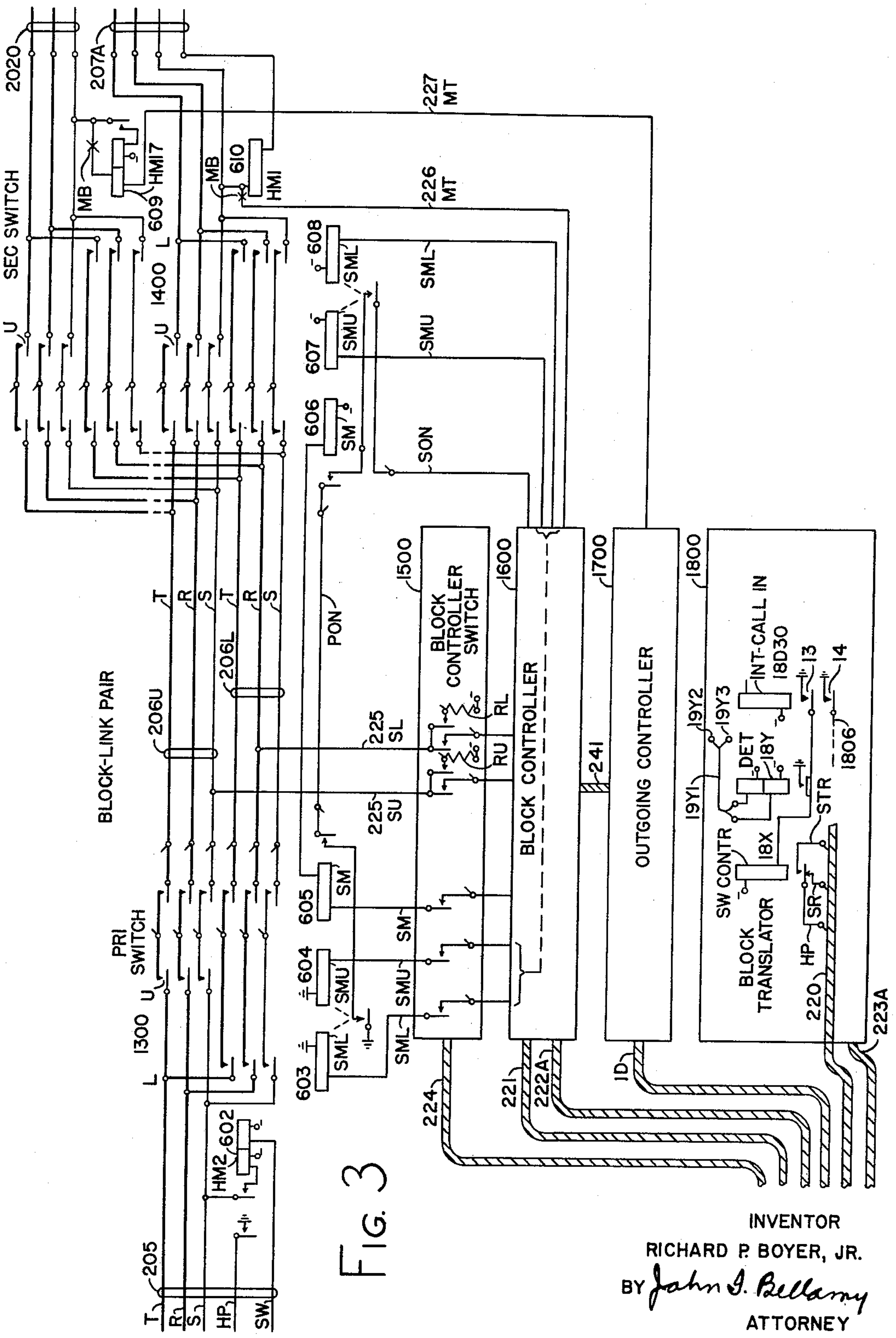

Figure 3 shows certain other apparatus on the block-link frame of the prior application. Illustrated are the primary and secondary block-link switches 1300 and 1400 for extending connections from block couplers such as 500, by way of block-link pairs such as links 206U and 206L, to outgoing trunk paths such as 2020 or to terminating trunks such as 207A. The apparatus of Figure 3 further includes block-controller switch 1500 of the former application, along with block and outgoing controllers 1600 and 1700 and block translator 1800. Items 1500 to 1800 may be similar to the corresponding items of the former application except for block translator 1800 which is modified, in certain illustrated circuit details, in accordance with the invention.

Figures 4, 7:
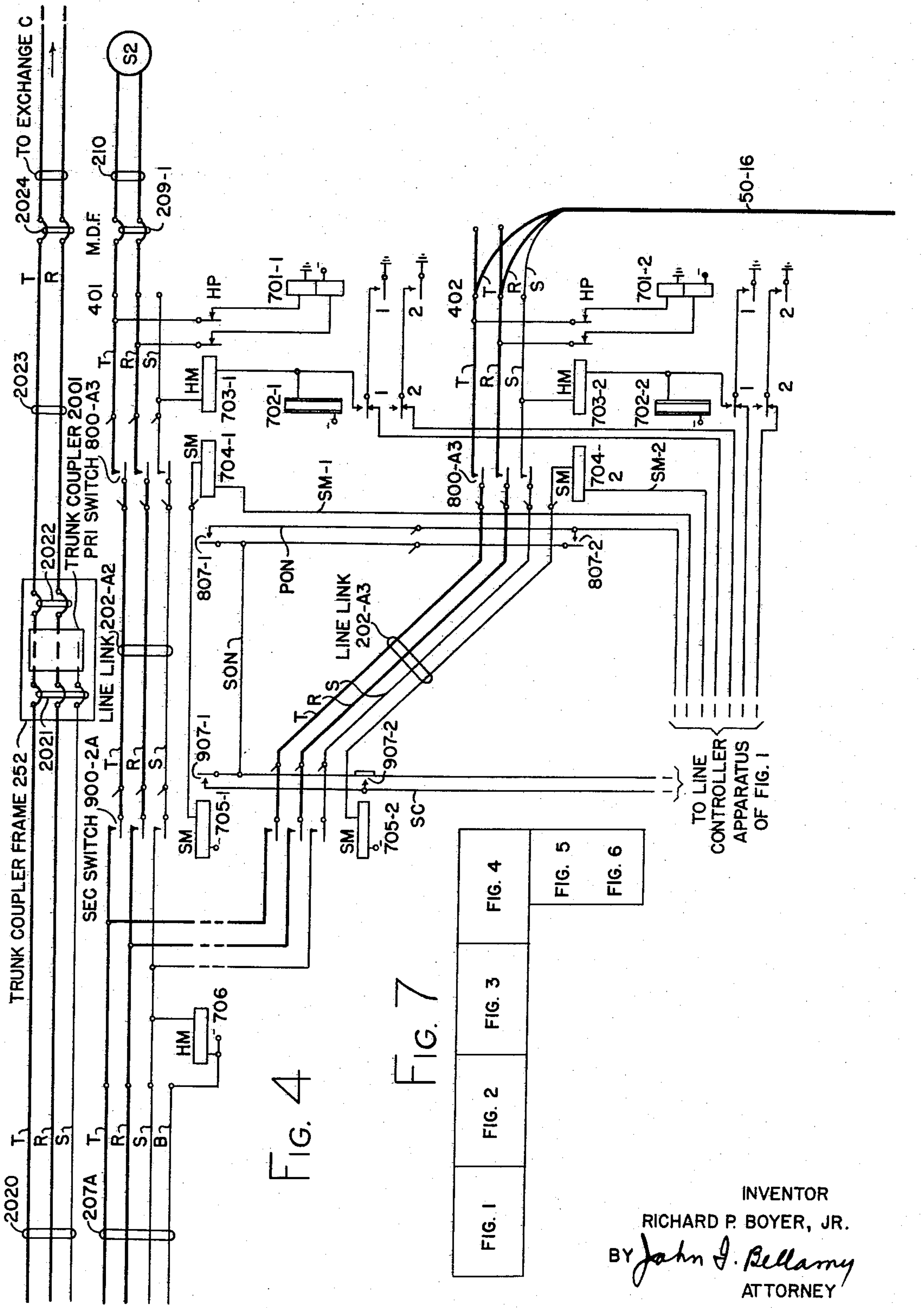

Figure 4 shows the further extension of outgoing-trunk wire 2020 through the trunk-coupler frame 252 of the former application to the associated 2-wire trunk outgoing from the illustrated exchange B to exchange C; Figure 4 also shows further switching apparatus of line-link frame A of Figure 1, comprising secondary switch 900–A2 and primary switches 800–A2 and 800–A3 for extending connections to and from lines such as 210 of Figure 4 and the line of the intercept operator of Figure 5, by way of two-way line links such as 202–A2 and 202–A3, respectively. The connections to these lines are by way of terminating trunks such as 207A, while the connections from the lines are by way of originating trunks such as 203A, Figure 1.

Figure 5:
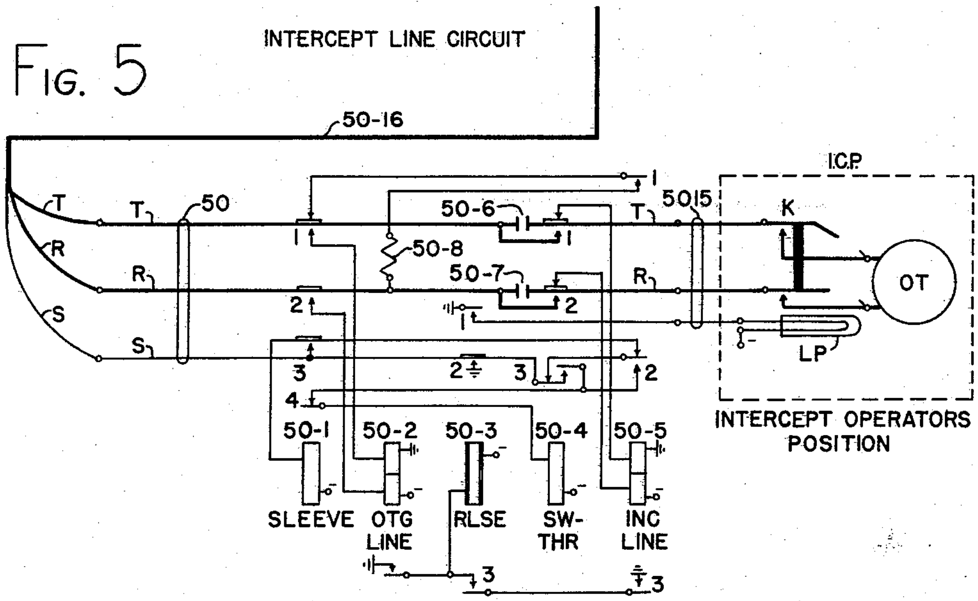

Figure 5 shows the intercept line circuit IC interposed between the intercept line or trunk 50–15 and the terminals 402 of the line equipment (items 701–2 to 703–2) which serves that intercept line, together with terminating apparatus at the intercept operator's position 1CP which may be in the same building with the exchange apparatus.

Figure 6:
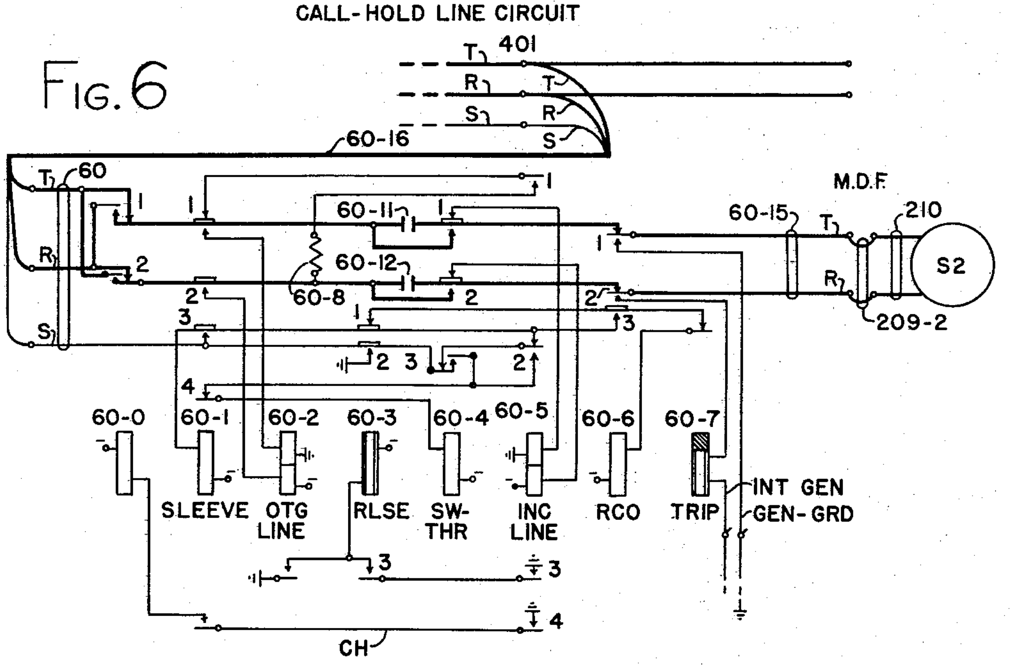

Figure 6 shows the call-hold line circuit CH temporarily inserted in the line 210 of Figure 4 to provide call-holding service, pursuant to which M. D. F. jumper 209–1 of Figure 4 has been replaced by jumper 209–2, and jumper 60–16 has been installed between the switchboard side of circuit CH and the line-equipment terminals 401 of Figure 4, which are reproduced in Figure 6.

It will be observed that station S1 of Figure 1 is labelled "Post-pay paystation." This station may thus comprise a public telephone. Such a post-pay paystation is illustrated in circuit detail in Figure 10 of the drawings of U. S. Patent 2,427,650, issued September 23, 1947 to P. Bakker. Such a pay-station is characterized by the fact that no coin need be deposited until the call is answered, as indicated by reversed-current answered supervision received over the calling line, at which time the talking apparatus is rendered ineffective until the coin is deposited to render it again effective.

The circuits of block coupler 500 (Figure 2) have been revised to enable switch-through relay 501 (which is operated on outgoing and on reverting calls) to be additionally operated under the control of the block translator 1800 (Figure 3) on certain locally terminated special-service calls, to (1) disable the block coupler from giving answered supervision, and (2) to join together the incoming and forward sleeve wires to enable the entire connection to be held from the called end. The said disabling is primarily to permit calls to be intercepted and answered, through apparatus such as that shown in Figure 5, without assessing a charge against stations such as S1 of Figure 1, while the said joining together enables call-holding service to be provided through apparatus such as that shown in Figure 6.

Specifically, the hold-pilot wire HP of group 205 (Figure 2), over which switch-through relay 501 is operated on outgoing calls and over which switching relay 513 is operated on terminating calls, is extended to the block translator over conductor HP in cable 220 when terminating chain relay 516 is operated, whereby switching-control relay 18X may determine which of the two relays 501 and 513 is operated (over wires STR and SR, respectively).

III. DETAILED DESCRIPTION

The invention having been described generally, a detailed description of the operation of the illustrated apparatus will now be given.

A. *Locally-originated calls*

When the receiver (not shown) is removed at calling station S1 of Figure 1, the usual direct current bridge is closed across tip and ring conductors T and R of line 200, thereby operating line relay 401 through hold pilot contacts HP of the associated hold magnet 403 on line-link primary switch 800–A1. Line relay 401 applies ground through contacts of lockout relay 402 to mark conductor M individual to the calling line, and to fives conductor F which is common to the five lines constituting the fives group in which the calling line is located.

Grounding fives conductor F applies a ground potential through fives resistor FR–1 to primary conductor P which is common to the twenty-five lines served by primary switch 800–A1. There are ten such wires P on line-link frame A, a separate one for each line-link primary switch.

Grounding the conductor P illustrated in Figure 1 causes line controller 1200A to set line-controller switches 1000A and 1100 upon the calling primary switch 800–A1 and with specific reference to the group of five lines including the calling line. Upon being so set, the line-controller switches close the indicated open points therein. Line controller 1200A now matches an idle path from calling line 200 to an originating trunk. This path may be assumed to be over line-link 202–A1 to originating trunk 203A. The test circuit for line-link 202–A1 from line-controller 1200A is from line-test conductor LT through contacts of one of the line-controller switches to link-sleeve wire LS, connected to the sleeve of 202–A1. The test is for an idle indicating battery potential on the sleeve of the link, which is supplied through the illustrated resistor LR in the line-controller, link-battery wire LB, and contacts of one of the line-controller switches. If line-link 202–A1 is busy, holding ground potential thereon masks the resistance-supplied battery potential, causing the link to test busy, but the idle-indicating battery potential is effectively received by the line-controller when the line-link is idle.

When originating trunk 203A (being connected to block coupler 500 through jumper 204) is idle, the line-controller 1200A receives an idle-indicating battery potential over match-test conductor MT–213A through the left-hand winding of hold magnet 406, sleeve conductor S of originating trunk 203A, contacts 1 of release relay 505, and resistor 532. On the other hand, when originating trunk 203A is in use, the idle-indicating battery potential on its sleeve conductor S is replaced by ground potential.

Upon matching a path over line-link 202–A1 to originating trunk 203A, line-controller 1200A grounds the link-select magnet wire LSM, closing a circuit through contacts of one of the line-controller switches and over select-magnet wire SM for primary and secondary select magnets 404 and 405 which are associated with the primary end and with the secondary end respectively of line-link 202–A1. Select magnets 404 and 405 thereupon operate to effect mechanical selection of link 202–A1 at primary switch 800–A1 and at secondary switch 900–A1. When select magnets 404 and 405 have both operated to effect the noted selection, battery potential from resistor CR in line-controller 1200A is extended through contacts 907 and 807 of magnets 405 and 404 respectively, wire PON leading to the line-controller switch 1000A and 1100A, and contacts of one of the line-controller switches to the primary-secondary off-normal wire PS–ON leading to the line controller.

Upon receiving battery potential over wire PS–ON, line-controller 1200A operates hold magnets 403 and 406 to extend the calling line over the selected line link 202–A1 to the matched originating trunk 203A. Hold magnet 403 is operated by the line-controller upon the application of ground potential to the illustrated sleeve-units conductor SU, which is extended through contacts of one of the line-controller switches to sleeve conductor S–211A (an extension of sleeve conductor S of the calling line), and thence to battery through hold magnet 403 and lockout relay 402 in series. Upon operating, hold magnet 403 closes the illustrated stackup of contacts of primary switch 800–A1 to extend calling line 200 to line link 202–A1. Additionally, it opens its illustrated hold-pilot contacts HP to disconnect line relay 401 (in the manner of the usual cutoff relay), whereupon line relay 401 restores.

Lockout relay 402, upon operating in series with hold magnet 403, prepares for placing the associated line in lockout condition if called upon so to do.

Line-controller 1200A operates hold magnet 406 by applying ground potential directly to match-test conductor MT–213A, closing a circuit through the left-hand winding of hold magnet HM and thence to battery through the resistor 532 in block coupler 500 over the previously traced path. Upon operating, hold magnet 406 connects conductors T, R, and S of line link 202–A1 respectively to the corresponding conductors of originating trunk 203A, completing the extension of the calling line to the calling trunk. At the same time, hold magnet 406 locks itself to ground on its right-hand winding to sleeve conductor S of trunk 203A. Initially the locking ground on the sleeve wire is maintained on the left-hand winding of hold magnet 406 and over the sleeve conductor controlling the line. The line-controller 1200A maintains the operate circuits of magnets 403 and 406 closed for an interval sufficient to permit the seized block coupler 500 to return holding ground over the sleeve conductor of the seized originating trunk 203A. Shortly thereafter, line-controller 1200A clears out and permits line-controller switches 1100A and 1000A to clear out, leaving the extended connection held by ground applied to the sleeve conductor thereof by the seized block coupler.

When block coupler 500 is seized by the described extension of a connection thereto from calling line 200, over line link 202–A1, originating trunk 203A, and jumper 204, line relay 503 operates over the calling line, through contacts 1 and 2 of relays 501 and 502. Line relay 503, at its front contact 1, operates release relay 505 through contacts 3 of relay 501. At its contacts 1, release relay 505 transfers the sleeve conductor of originating trunk 203A from battery through resistor 532 to holding ground. The established connection, from the calling line to the block coupler, is thereby maintained after the line-controller apparatus of Figure 1 has cleared out.

Relay 505, at its contacts 3, opens a point in the circuit of a release-pulse relay (not shown) and prepares the local impulse circuit for the digit registers IDR to SR.

On hearing a dial-tone signal, the calling subscriber dials the digits in the directory number of the called line or station.

Each time the calling device is operated to transmit a series of circuit-interruption impulses, line relay 503 is restored momentarily for each such interruption impulse in a series, comprising from one to ten impulses, depending on the digit dialed.

Release relay 505 remains operated throughout any series of impulse-induced restorations of line relay 503, being slow restoring because of its indicated copper sleeve.

With release relay 505 maintained continuously operated, each restoration of line relay 503 delivers as impulse at its break contact 1 through make contact 3 of relay 505, to wire 550 connected to the digit registers.

B. *Outgoing call from line 200*

On the dialing of any initial digit 2 to 0, register IDR makes connection with the corresponding one of the nine initial digit leads ID2 to ID10 (illustrated in the former application) in controller 1700 over cable ID. One of these leads corresponds to the initial digit assigned to the 1000-line block of local line numbers, and is rendered ineffective at the outgoing controller. The remaining ID leads may correspond to respective groups of outgoing trunks, and extend to the block controller through respective initial-digit relays of the outgoing coupler.

When the initial digit dialed is one assigned to a group of outgoing trunks, such as those outgoing to exchange C, the outgoing chain is closed to extend marking ground to the outgoing controller 1700 over the one of leads corresponding to the dialed digit. This operation is subject to the outgoing chain being idle, in which case a ground potential is present on the outgoing-chain-in conductor of the first coupler in the block-coupler section containing the calling block coupler 500. The called group in the outgoing controller is then marked and the block controller is informed that an outgoing call has been received. The outgoing controller thereupon informs the block controller as to the busy or idle condition of each of the outgoing trunks in the called group, while the block controller proceeds to match a path across the block-link frame to an idle one of them.

If no outgoing trunk in the called group is available (as when all trunks in the called group are busy, or when no match is possible to any idle one of them), or if an assigned initial digit has been dialed, the block controller arranges for an outgoing busy tone to be applied to the calling line.

Normally, there is an available idle trunk in the called outgoing group, such as trunk 2020 in which event an idle path is matched to such trunk over a block link such as 206U of the pair illustrated in Figure 3. The idle condition of trunk 2020 is indicated in the outgoing controller 1700 by idle-indicating battery potential normally applied to sleeve conductor S of trunk 2020 by trunk coupler 2001 and reaching the outgoing controller through the left-hand winding of hold magnet HM17 and match-test conductor MT–227. The busy or idle condition of block links such as 206U and 206L is determined by the block controller over respective sleeve conductors 225 extended thereto through contacts of the block-controller switch 1500. Sleeve resistors RU and RL are connected respectively to conductors 225 by the block-controller switch, thereby applying idle-indicating battery potential to each of them subject to being masked by ground potential thereon at any block line which is actually in use.

When the path over items 206U and 2020 has been determined by the matching operation of controllers 1600 and 1700, block controller 1600 closes a circuit through contacts of block-controller switch 1500 and over select-magnet wire SM of principal select magnets 605 and 606 in series. In order to effect selection of the matched upper link 206U of the illustrated pair, as distinct from the lower link 206L thereof, block controller 1600 closes a circuit from ground through the upper auxiliary select magnet SMU–604 of primary switch 1300 over the associated wire SMU and contacts of the block-controller, wire SMU leading to switch 1400, and thence to battery through the upper auxiliary select magnet SMU–607. Auxiliary magnets 604 and 607 thereupon operate to complete the mechanical selection of link 206U.

An off-normal or pilot circuit now extends from ground through off-normal contacts controlled in common by auxiliary select magnets 603 and 604 of switch 1300, contacts of any one of the ten principal magnets 605, primary off-normal conductor PON, contacts controlled by any one of the ten principal select magnets 606, contacts controlled in common by auxiliary select magnets 607 and 608, and thence over secondary off-normal conductor SON to block controller 1600.

Upon receiving ground as noted over the associated conductor SON, block controller 1600 closes circuits to effect the extension of the connection through switches 1300 and 1400. Closure of the switch 1400 is responsive to the application of ground potential to match-test conductor MT–227 by the block controller thereby closing a circuit through the left-hand winding of hold magnet 609 and thence over sleeve conductor S of outgoing trunk 2020 to battery in trunk coupler 2001. Hold magnet 609 thereupon locks its right-hand winding to the associated sleeve conductor S, at the same time closing its principal stackup (vertically aligned with magnet 606) which partially extends both block links of the illustrated pair, and closing its upper auxiliary stackup U (aligned with select magnet 607) to extend the conductors T, R, and S, of block link 206U respectively to conductors T, R, and S of the matched outgoing trunk 2020.

The circuit closed by block controller 1600 for effecting closure of the matched connection at primary switch 1300 is over outgoing switching conductor OTG–SW (shown in cable 221), and thence through contacts 1 of outgoing-chain relay 515, switching conductor SW, and thence to battery through the right-hand winding of hold magnet HM2–602. Magnet 602 locks its left-hand winding to ground on the associated sleeve conductor S of extension group 205, and at the same time closes its associated principal and auxiliary stackups selected respectively by magnets 605 and 604. Conductors T, R, and S in group 205 are thereby extended respectively to conductors T, R, and S in block link 206U, and thence through secondary switch 1400, as stated, to the corresponding conductors in outgoing trunk 2020.

Hold magnet 602 also grounds hold-pilot wire HP in group 205, thereby closing an operate circuit for switch-through relay 501 of block coupler 500.

An operating, switch-through relay 501 opens the closed outgoing chain thereby initiating the clearing out of the common apparatus 1500, 1600, and 1700, and restoring outgoing-chain relay 515.

At its contacts 1 and 2, relay 501 switches the tip and ring conductors of the attached originating trunk through metallically to conductors T and R of extension group 205, now extended across the block-link frame to the trunk coupler 2001 (Figure 4) associated with the seized outgoing trunk. The line and release relays (not shown in Figure 4) thereupon operate in the seized trunk coupler, whereby holding ground is applied to the sleeve wire at that point to maintain the extended connection.

Line relay 503 of the block coupler is disconnected and restored by the described switch-through operation. After a slight interval, release relay 505 restores and removes the local holding-ground connection from the sleeve conductor, leaving the established connection held by the seized trunk coupler. Relay 501 is the only relay now held operated in block coupler 500.

The impulses constituting the remaining digits in the called number are repeated at block coupler 2001 of Figure 4 as described in the former application.

When trunk coupler 2001 on the seized outgoing trunk clears out, responsive to the receiver being replaced on the calling line, it removes ground potential from the sleeve conductor of the established connection, thereby breaking down the connection by releasing the primary and secondary hold magnets 602 and 609 on the block-link frame and lockout relay 402 and hold magnets 403 and 406 (Figure 1) on the line-link frame. The release of primary hold magnet 602 on the block-link frame ungrounds the associated conductor HP to release switch-through relay 501 of coupler 500.

C. *Terminating calls*

When following the described seizure of block coupler 500, the initial digit dialed is the digit 6, serving as a thousands digit to index the local block of one thousand line numbers, the corresponding initial digit lead ID6 (not shown) is selected by initial digit register IDR. Lead ID6 stands open in the outgoing controller, wherefore outgoing chain relay 515 is not operated, and none of the common equipment is taken for use at this time.

The dialing of the initial digit is followed by the dialing of the hundreds, tens, units, and stations digits in the called number. They are registered on the corresponding digit registers of the block coupler 500 and at the end of the registration of the stations digit the block controller and translator are called in and the terminating chain relay 516 is operated.

Upon receiving the extended digit information, the block translator transmits a suitably translated version of the hundreds, tens, and units digits to the line controller on the line-link frame at which the called line terminates, using the station-digit information only for the noted ringing-control purpose, and station-intercept purposes to be explained subsequently.

If the called line is idle, and if an idle path can be matched thereto, the block controller matches such a path, such as over block link 206U (Figure 3), terminating trunk 207A, and line link 202–A2.

Block link 206U is selected mechanically at switches 1300 and 1400 by the operation of select magnets 604 to 607 as described for an outgoing call, whereupon they cooperate to ground conductor SON as described to signal the block controller 1600.

Line link 202–A2 is selected mechanically by the operation of select magnets SM–705–1 and SM–704–1. Their circuit is closed at the block controller through line controller 1200A, wire LSM, a contact pair of one of the line-controller switches, the associated select-magnet wire SM–1, and thence to battery through magnets 704–1 and 705–1 in series.

With magnets 705–1 and 704–1 operated, a signal is transmitted to block controller 1600 over a circuit path from battery at control resistor CR of the line controller 1200A, series contacts of magnet 705–1 and 704–1, contacts of line-controller switch, and thence to the block controller.

Upon receiving the noted signal that the select magnets have operated on the block-link and line-link frames, block controller 1600 grounds the sleeve of the called line 210 (Figure 4) over a test extension thereof, thereby operating hold magnet HM–703–1 in series with lockout relay 702–1. Magnet 703–1 disconnects line relay 701–1 and connects the called line to the selected line link 202–A2. Block controller 1600 also grounds the sleeve wire of the matched terminating trunk 207–A (by way of wire MT–226), thereby operating magnet HM1–610 on the block-link frame and secondary hold magnet HM–706 on the line-link frame. Block link 206U is thereby extended over conductors T, R, and S of trunk 207A to line link 202–A2. Block controller 1600 also grounds its switching wire TER–SW (shown in cable 221), closing a circuit through contacts 1 of relay 516 of block coupler 500, and over conductor SW extending therefrom, to operate the associated primary hold magnet HM2–602 to complete the connection over the matched path to the called line. Hold magnet HM2–602 also closes its local contacts to ground hold-pilot conductor HP, which operates switching relay 513 over lead SR which is connected to conductor HP through the break contacts of the switch-control relay 18X in the block translator.

Upon operating, switching relay 513 causes relay 516 to restore and free the terminating chain and the common apparatus. Contacts 2 and 3 of relay 513 close the ringing circuit to the called line.

The block couplers and their associated common ringing apparatus provide for accommodating up to ten harmonic-ringing stations, either bridged or divided ringing, on any party line by (1) employing a one-ring code and a two-ring code for each of five frequencies of ringing current, and by (2) ringing over one line wire or the other according to the station called, as shown in the following ringing chart:

The ringing circuit is from generator to conductor 524, line winding of ring-cutoff relay 510, make contacts 3 of switching relay 513, whence it passes to the ring conductor R of the called line break contact 3 of relay 510.

A return path to ground for the transmitted ringing current is provided over the tip conductor T through break contacts 2 of relay 510, and make contacts 2 of relay 513 to conductor GEN–GRD.

Ring-cutoff relay 510, whose line winding is included in the ringing circuit does not operate before the call is answered, for each ringer (not shown) on the called line has the usual condenser in series therewith to block D. C. flow, and because the shading collar surrounding the armature end of the core of relay 510 keeps it from responding to the alternating ringing current.

In order to permit ring-cutoff relay 510 to be operated by direct-current flow during the application of ringing current (if the call is then answered), any applied frequency of ringing current is in series with (superimposed on) the free pole of the usual grounded exchange battery. Preferably, during the silent period, battery alone is applied to the generator lead rather than generator current in series with the exchange battery.

When the call is answered at the called station S2 on line 210, the closure of the usual talking bridge across the called line causes direct current to flow thereover from the generator lead in use, operating ring-cutoff relay 510 through its line winding. At its contacts 2 and 3, relay 510 opens the ringing circuit and completes the talking circuit.

Back-bridge relay 502 now operates over the called line. It interchanges the incoming tip and ring conductors to reverse the current flow over the calling line to actuate the call registering and charging apparatus and to serve any other required supervisory function.

During conversation, the following five relays of block coupler 500 are energized:

1. Back-bridge relay 502.
2. Line relay 503.
3. Release relay 505.
4. Ring-cutoff relay 510.
5. Switching relay 513.

If the called subscriber (at station S2, Figure 4) is the first to replace his receiver at the end of the conversation, back-bridge relay 502 thereupon restores, reversing current flow over the calling line back to normal direction.

When the receiver is replaced on the calling line, line relay 503 restores and (at its make contact 1) open-circuits release relay 505, which restores a moment later, removing ground potential (at its make contacts 1) from the sleeve conductor S of the established connection. The established connection is thereby cleared out, by the release of the primary and secondary hold magnets 403 and 406 on the calling line-link frame, the primary and secondary hold magnets 602 and 610 on the block-link frame, and the secondary and primary hold magnets 706 and 703–1 on the called line-link frame. The release of primary hold magnet 602 on the block-link frame ungrounds conductor HP, restoring switching relay 513.

D. *Intercept service*

As pointed out in the former application, member intercept service is provided by block translator 1800 by providing over-riding intercept translation on calls for disconnected lines or stations to reroute such calls to an intercept operator. As many as twenty separate lines can be placed on intercept service by assigning intercept detector relays to them. Intercept call-in relay 18D30 is controlled by any of the detector relays so assigned to call in for an idle intercept trunk.

When number-intercept service is to be applied to a line, an available one of a number of intercept detector relays is assigned thereto, and a two-wire line-detecting jumper and a one-wire station-detecting jumper are installed as explained in the former application.

If, for example, intercept service is to be provided for a given line, or for a station disconnected from that line if it is a multi-station line, an intercept detector relay may be assigned to this line number. As described in the former application, this is accomplished by running a two-wire detector jumper from the intercept detector relay pins in the common field to the terminal pins in the detector field representing the line to which intercept service is given. The first wire of the jumper detects the hundreds digit, while the second wire of the jumper detects the tens and units digits. With this two-wire detector jumper installed, the intercept detector relay assigned to the line operates subject to the line number being registered in the translator.

If the line to which a detector relay has been assigned is an individual line, all calls thereto are intercepted, subject to current flow over a jumper connected to ground and over which current flows from ground to operate intercept call-in relay 18D30 whenever the assigned intercept relay operates, irrespective of the registered stations digit. This operation is termed line intercept.

On the other hand, if the line to which an intercept detector relay has been assigned is a multi-station line from which a specific station has been disconnected, one of the station pins is jumpered to the station bus bar corresponding to the station digit of the disconnected station. With this arrangement, the detector relay operates whenever the line number is registered, but without effect until the stations digit is registered, whereupon ground is passed to relay 18D30.

Since an intercepted call is one for which no charge is to be exacted, provisions are made to prevent the back-bridge relay 502 from effecting a current reversal to exact a charge from the calling line when the intercept operator is reached. Broadly, this is accomplished by utilizing the switch-through relay 501 to extend straight potential to the calling line from the intercept operator's battery circuit over the tip, ring and sleeve leads of the originating trunk 203A.

D1. *Intercept call from line 200*

More specifically, when a call is originated such as from line 200 to a line arranged for intercept service, the block coupler 500 is seized and the line relay 503 operates as usual over the calling line and at its contacts 1, operates release relay 505 through contacts 3 of relay 501. At the contacts 1 of release relay 505, the sleeve conductor of originating trunk 203A is transferred from battery through resistor 532 to holding ground. The connection of the calling line to the block coupler is thereby maintained after the line controller apparatus drops out. As described for an originating call, each restoration of line relay 503 during dialing delivers an impulse at its break contacts 1 through make contacts 3 of relay 505, to wire 550 connected to the digit registers.

The dialed hundreds, tens, units and station digits are registered in the corresponding digit registers and at the end of the registration of the stations digit, the block controller and translator are called in simultaneously along with operation of terminating-chain relay 516. The receiving of the registered digit information by the block translator from the coupler 500, causes the intercept-detector relay assigned to the number of the disconnected line to be operated as described in the former application.

Operation of the assigned intercept-detector relay results in extension of ground to the winding of intercept call-in relay 18D30, thereby causing it to operate. Closure of contacts 13 and 14 of this relay applies ground to the winding of switch control relay 18X causing it to operate and apply ground to wire 1806 which functions normally as described in the former application to halt the fixed translation of the dialed number and to provide overriding translation.

The break-make contacts of relay 18X disconnect the hold-pilot wire HP from the switching-relay wire SR and connect it to the switch-through relay wire STR, thereby operating switch-through relay 501 through contacts 13 of the already operated relay 516. Relay 501 closes its contacts 6 to provide a holding path for itself to ground on hold-pilot wire HP. Operation of relay 501 also connects the tip, ring, and sleeve wires of originating trunk 203A to the tip, ring, and sleeve wire of extension group 205 of the block coupler 500 and disconnects operating ground from release relay 505. Relay 505, however, being a slow-release relay, is designed so that it does not disconnect the local ground connection from the sleeve wire of trunk 203A until certain relay functions have had time to occur in the intercept operator's circuit to provide another holding-ground connection in a manner subsequently explained.

On operating, switch-through relay 501 opens the closed terminating chain, thereby initiating the clearing out of the common apparatus 1500, 1600, and 1800 and restoring terminating chain relay 516. In addition, line relay 503 of the block coupler is disconnected and restored by the described switch-through operation.

Along with operation of the assigned detector relay and intercept call-in relay 18D30, the translated number for the intercept operator's line is transmitted to the line controller. The line controller upon receiving the translated digit information determines a path over an idle line link to the intercept operator's line if that line is idle. The block controller 1500 and line controller then functions to match an idle block link and terminating trunk to the idle line link, for establishing a path such as over block link 206U (Figure 3), terminating trunk 207A, and line link 202–A3.

The switching operations involved in providing an extended path to the intercept operator are the same as those involved in establishing a path through to a called line for a terminating call. Block link 206U is selected mechanically at switches 1300 and 1400 by the operation of select magnets 604 to 607 whereupon they cooperate to ground conductor SON to signal the block controller 1600.

Line link 202–A3 is selected mechanically by the operation of select magnets SM–705–2 and SM–704–2. Their circuit is closed at the block controller through line controller 1200A, wire LSM, a contact pair of one of the line controller switches, the associated select magnet wire SM–2 and then to battery through magnets 704–2 and 705–2 in series.

With magnets 705–2 and 704–2 operated, a signal is transmitted to the block controller over a circuit path from battery at control resistor CR of the line controller 1200A, series contacts of magnets 705–2 and 704–2, contacts of a line controller switch and then to the block controller. Upon operation of the select magnets on the block-link and line-link frames, the block controller grounds the sleeve of the intercept operator's line over a test extension thereof, thereby operating hold magnet HM–703–2 in series with lockout relay 702–2. Magnet 703–2 disconnects line relay 701–2 and connects the called line to the selected line-link 202–A3. With tip, ring, and sleeve of the calling line connected to the tip, ring, and sleeve wires of the intercept operator's circuit IC, sleeve relay 50–1 is operated by ground potential supplied to its winding over break contacts 3 of switch-through relay 50–4 and break contacts 2 of incoming line relay 50–5 whereupon relay 50–1 provides its own holding path through its make contacts 3. Closure of the make contacts 1 and 2 of sleeve relay 50–1 completes the circuit for outgoing line relay 50–2 causing it to apply operating ground to line release relay 50–3 through its contacts 1. Operation of the sleeve relay 50–1 causes the operation of relay 50–2 and 50–3 in quick succession thereafter, while at its break contacts 4 it opens the operating path for switch-through relay 50–4.

Upon operation of line-release relay 50–3, ground is applied to the lamp LP of the intercept operator's position ICP thereby energizing the lamp and notifying the intercept operator of the presence of a call on her line. Ground is also applied on the sleeve path of the calling line over contacts 2 of line release relay 50–3. An instant later, release relay 505 in the block coupler restores and removes the holding ground connection therein at the sleeve conductor, leaving the established connection held by the intercept operator's circuit.

The operator on noting the presence of a call on her line, connects the talking circuit of her set to the tip and ring conductors of the line incident to manipulation of her talking key K. Incoming line relay 50–5, through the windings of which, battery current is supplied to the operator's circuit, is thereby operated to apply a ground through its contacts 3 to the winding of line release relay 50–3. With these relay operations completed, the operator's circuit is ready to permit conversation for transmittal of the information for which the call was intercepted.

During conversations carried on between a calling party and the operator audio signal currents pass through coupling condensers 50–6 and 50–7, while battery current on which the audio currents are superimposed is supplied locally for the calling line and operator's circuit from line relays 50–2 and 50–5, respectively. Upon completion of the conversation, switch-through relay 50–4, which is controlled by line relays 50–2 and 50–5, is maintained operated until the talking circuits of both the calling party and the intercept operator have been disconnected from the talking path. Line-release relay 50–3 restores a moment following disconnection of both talking circuits, thereby removing ground potential (at its contacts 2) from the sleeve conductor S of the established connection, and also removing ground from the lamp LP whereby the operator is notified that the calling party has replaced his receiver. The established connection is cleared out upon removal of ground from its sleeve conductor by release of the primary and secondary hold magnets 403 and 406 on the calling line-link frame, the primary and secondary hold magnets 602 and 610 on the block-link frame, and the secondary and primary hold magnets 706 and 703–2 on the called line-link frame. The release of primary hold magnet 602 on the block-link frame ungrounds conductor HP, thereby restoring switch-through relay 501.

D2. *Calling out over intercept line 50–15*

When the intercept operator desires to make a call out over the intercept line from position ICP, her key K is manipulated in the usual manner to place talking circuit OT across the tip and ring conductors T and R of the line, whereupon incoming line relay 50–5, from which talking battery is supplied, operates to place bridge resistance 50–8 across the tip and ring conductors through its contacts 1 on the line link side of the coupling condensers 50–6 and 50–7. The usual direct-current bridge is thus closed across the tip and ring conductors of line 402, thereby operating line relay 701–2 through hold pilot contacts HP of the associated hold magnet 703–2 on line-link primary switch 800–A3. Operation of line relay 701–2 sets the line controller into operation as for an originating call from an ordinary subscriber station, whereupon a path is matched over a line link to an originating trunk, and primary and secondary switches are closed to complete the extension of calling intercept line to the calling trunk, and a block coupler such as block coupler 500 is seized.

The block coupler functions in the usual manner as for a normal originating call and places ground on the sleeve conductor of the extended path which extends back to operate the switch-through relay 50–4 in the intercept-operator's circuit through closed contacts 2 of the incoming-line relay 50–5 and contacts 4 of the sleeve relay 50–1. Operation of switch-through relay 50–4 establishes a direct metallic connection between the tip and ring of the extended path to the tip and ring of the intercept-operator's line 50–15 through its contacts 1 and 2, thereby bypassing line-coupling condensers 50–6 and 50–7. Incoming-line relay 50–5 is disconected at contacts 1 and 2 of switch-through relay 50–4 thus leaving talking battery to be supplied by the block coupler, while at its contacts 3 the switch-through relay provides its own holding path independent of the contacts 2 of incoming-line relay 50–5. Release of incoming-line relay 50–5 removes the bridging resistance 50–8 at its contacts 1, thus clearing the extended line and permitting the operator to originate a call in the usual manner as from an ordinary subscriber sub-station.

Upon completion of the conversation, ground is removed from the sleeve conductor of the extended path incident to normal operation of the common apparatus following disconnection of the operator's set from the line, regardless of whether the receiver is hung up on the called line or not, whereupon switch-through relay 50–4 is released, thereby returning the intercept-operator's circuit to normal condition for use on intercept service.

E. *Call-holding service for line 210*

The call-holding equipment herein disclosed is designed so that the switching path for a call made to a subscriber having such equipment installed in his line, is held by a hold-ground connection provided by the call-hold equipment itself as long as the called subscriber holds the receiver removed at his station, regardless of whether the calling party has hung up or not.

In assigning call-hold service to a subscriber's line, such as line 210, the special call-hold apparatus of Fig. 6 is connected in the line merely by running new jumpers for the line and assigning a special detector relay to it, somewhat similar to the detector relay assigned to a line for intercept service.

The detector relay 18Y in the block translator is assigned to the line 210 by connecting the detector relay by way of a two conductor jumper 19Y1 (comprising conductors 19Y2 and 19Y3) to the terminals corresponding to the line number in the terminal-pin field.

E1. *Calls to line 210*

When a call is originated from a line such as line 200, to line 210 of Fig. 6, the block coupler 500 is seized, and line and release relays 503 and 505 respectively, are operated in quick succession as for a normal originating call. The sleeve of the originating trunk 203A is connected to ground through the make contacts 1 of release relay 505 to hold the calling line after the line controller apparatus drops out. The number of the called line is registered in the digit registers upon completion of dialing, whereupon the block controller and translator are called in simultaneously along with operation of terminating chain relay 516. The detector relay 18Y is operated when the registered digit information is transmitted to the block translator, thereby causing switch-control relay 18X to be operated by application of ground to its winding through make contacts 1 of relay 18Y.

Operation of switch-control relay 18X connects the hold-pilot wire HP to switch-through relay wire STR through the make contacts 1 of relay 18X. A ground connection which was placed on conductor HP by hold magnet HM–602 upon operation of terminating chain relay 516, is thus extended to switch-through relay 501 over wire STR in cable 220 and contacts 13 of terminating chain relay 516. Switch-through relay 501 thus is operated and provides its own holding path through its contacts 6 and establishes a direct metallic connection between tip, ring, and sleeve conductors of the extended originating trunk 203A and the corresponding conductors of group 205. Relay 501 also disconnects operating ground from release relay 505, which because of its slow release characteristic, does not disconnect the local ground which it controls on the sleeve wire of trunk 203A until such ground is replaced by a ground connection provided by operation of release relay 60–3 in the call-hold circuit of Fig. 6.

With the operation of switch-through relay 501, the closed terminating chain is opened as explained in the former application, thereby initiating the clearing out of the common apparatus 1500, 1600, and 1800 and restoring relay 516. Line relay 503 of the block coupler is also restored by disconnection of battery potential therefrom at contacts 1 and 2 of relay 501.

The switching operations entailed in connecting the calling line 200 to the called line 210 over line-link 202–A2 are the same as those entailed in completing the usual terminating call explained above. Block-link 206U is selected mechanically at switches 1300 and 1400 by the operation of select magnets 604 to 607 while line link 202–A2 is selected incident to the normal sequence of operation of relays 701–1 through 705–1 and hold magnets 706 under control of the block controller.

Upon such switching being effected, the ground on the sleeve conductor of jumper 60–16 is extended to the sleeve relay 60–1 of Fig. 6 over closed back contacts 2 of incoming-line relay 60–5. Contacts 1 and 2 of operated relay 60–1 connect outgoing-line relay 60–2 across the tip and ring conductors of the line side of the call-hold circuit, thereby providing talking battery for the calling line 200. Relay 60–1 also provides its own holding path through its contacts 3 and opens the operating path for switch-through relay 60–4 at its contacts 4, while at its contacts 5 it prepares an operating path for current-reversing relay 60–0.

While relay 60–1 is being operated, the ring cut-off relay 60–6 is also being operated by ground extended over a path provided by the sleeve conductor S of jumper 60–16, break contacts 2 of incoming-line relay 60–5, break contacts 1 of release relay 60–3, and contacts 1 of ring-trip relay 60–7. Relay 60–6 thereupon provides a holding path for itself to the grounded sleeve conductor S of its own make contacts 3. At its make contacts 1 and 2, relay 60–6 connects the tip and ring conductors of the called line 210 to a ringing circuit over which interrupted ringing current is supplied. Simultaneously with the connection of the ringing circuit to line 210, the tip and ring conductors of the line are disconnected from the corresponding conductors of conductor group 60 at the break contacts 1 and 2 of relay 60–6.

When outgoing line relay 60–2 is operated, it provides an operating ground over its make contacts 1 for release relay 60–3, thereby operating release relay 60–3 which at its break contacts 1 opens the operating ground path to relay 60–6 through the contacts 1 of relay 60–7, thus leaving relay 60–6 operated over its own holding path provided through its contacts 3. Relay 60–6 establishes another operating ground connection for sleeve conductor S at its contacts 2, and at its contacts 3, prepares an auxiliary operating ground connection path for itself through contacts 2 of relay 60–5.

When the called party S2 answers responsive to the signals supplied over the ringing circuit, the ring-trip relay 60–7, which functions in the described manner of ring cut-off relay 510 of Fig. 2, is operated by the closed direct-current path thus provided over the line 210, thereby at its contacts 1 opening the operating path of ring cut-off relay 60–6, which when it restores, reconnects the tip and ring conductors of line 210 at its contacts 1 and 2 to the corresponding conductors of line group 60. An operating path is thereby provided for incoming line relay 60–5 over which battery potential is provided for the called line 210. Incoming line relay 60–5 also provides a second and hold-controlling operating ground for release relay 60–3 at its contacts 2, while at its contacts 3 it provides the operating-ground path for relay 60–0.

In operating, current-reversing relay 60–0, at its make-break contacts 1 and 2, interchanges the incoming tip and ring conductors of jumper 60–16 to reverse the current flow over the calling line to actuate the call registering and charging apparatus (not shown).

The ground connection maintained on sleeve conductor S at contacts 1 of release relay 505 in the block coupler is removed upon restoration of relay 505 an instant after operation of release relay 60–3 in the call-hold line circuit. Thus, the holding ground for the switching path between the calling and called lines is controlled by release relay 60–3, which in turn is controlled by outgoing and incoming line relays 60–2 and 60–5 respectively. As long as either one of these connected lines has its receiver removed from the hook, release relay 60–3 will retain holding ground for the switching path between the lines. Therefore, if the party at station S2 wishes to have a call from a calling party traced back to its source, he need only keep the receiver at his station removed after the calling party has hung up, and then communicate with the operator over another telephone line to have calling party traced back to his line terminal over the switching path held operated in the central office.

When both the calling and called parties hang up, ground is removed from the winding of release relay 60–3, whereupon it is deenergized and restores an instant later to disconnect the hold-ground connection at contacts 2.

Current-reversing relay 60–0 is restored upon removal of ground from its operating circuit at the make contacts 3 of incoming-line relay 60–5 when relay 60–5 restores following the receiver being hung up at station S2.

E2. *Calls from line 210*

When the receiver is removed at station S2 incident to making a call over line 210, incoming-line relay 60–5 operates and supplies battery current through its windings to the line. With the operation of relay 60–5, a bridging resistance 60–8 is connected at its contacts 1 across the tip and ring conductors of the call-hold line circuit on the line link side of the coupling condensers 60–11 and 60–12. The usual direct current bridge is thus established across the tip and ring conductors of line 401 for calling in the line controller apparatus as for an originating call from an ordinary subscriber station. A path is then matched over a line-link to an originating trunk, primary and secondary switches are closed to complete the extension of the calling line to the calling trunk, and a block coupler is seized. The block coupler functions in normal manner as for a usual originating call and places ground on the sleeve conductor of the extended path to operate switch-through relay 60–4 in the call-hold line circuit through closed make contacts 2 of incoming-line relay 60–5 and closed break contacts 4 of sleeve relay 60–1. Operation of switch-through relay 60–4 establishes a direct metallic connection between tip and ring of the extended path to the tip and ring of the call-hold line circuit through its contacts 1 and 2, thereby bypassing line-coupling condensers 60–11 and 60–12.

Incoming-line relay 60–5 is disconnected at contacts 1 and 2 of switch-through relay 60–4, thus leaving talking battery to be supplied by the block coupler 500, while at its contacts 3 the switch-through relay provides its own holding path independent of contacts 2 of incoming line relay 60–5. Restoration of the incoming-line relay 60–5 removes the bridging resistance 60–8 at contacts 1, thus clearing the extended line and permitting the operator to originate a call over the direct metallic path in the usual manner as from an ordinary subscriber substation.

Upon completion of the conversation, ground is removed from the sleeve conductor of the extended path incident to normal operation of the common apparatus following replacement of the receiver at station S2, whereupon switch-through relay 60–4 is released to return the call-hold line circuit to normal unoperated condition ready for regular use.

I claim:

1. In a telephone exchange system, lines having respective call designations, block couplers, switching apparatus, means for operating the switching apparatus to extend connections from calling lines to respective block couplers, means responsive to the transmission over any calling line of the called designation of any other line for extending a connection from the connected block coupler to the called line, means for signalling the called line over the last said connection, supervisory means in the connected block coupler controlled over the called line responsive to the act of answering the call for applying a condition of answered supervision to the connection extending to the last said block coupler from the calling line, an intercept line, intercept-detection means and means for operating it, first and second responsive means independently responsive to the operation of the intercept-detection means, means enabling said first responsive means to control the switching apparatus to divert to the intercept line calls made through any block coupler to desired predetermined ones of said lines, disabling means in any block coupler for disabling the said supervisory means thereof, and means enabling said second responsive means to operate the said disabling means in any block coupler through which a said diverted call is made.

2. In a telephone exchange system according to claim 1, each block coupler including inductive coupling means interposed between the two lines of any said extended connection, the said means for disabling including means for metallically bypassing the said inductive coupling means and the said supervisory means.

3. In a telephone exchange system according to claim 1, means common to all said block couplers for recording the designation of any line called through any one of them, and means in said common means responsive to the recordation of any said designation for operating the means for controlling the switching apparatus and for controlling the means for operating said disabling means.

4. In a telephone exchange system, lines having respective call designations, block couplers, switching apparatus, means for operating the switching apparatus to extend connections from calling lines to respective block couplers, means responsive to the transmission over any calling line of the call designation of any other line for extending a connection from the connected block coupler to the called line, means for signalling the called line over the last said connection, supervisory means in the connected block coupler controlled over the called line responsive to the act of answering the call for applying a condition of answered supervision to the connection extending to the last said block coupler from the calling line, an intercept line, means common to all said block couplers for recording the designation of any line called through any one of them, controlling means included in and controlled by the recording means for controlling the said operation of the switching apparatus in extending connections from the block couplers to called lines, means included in the said controlling means for causing the switching apparatus to divert to the intercept line calls made to predetermined lines, and means also included in and controlled by said recording means for operating said disabling means in the block couplers.

5. In a telephone system, block couplers, means for extending connections from respective calling lines to the block couplers, common control means and means for rendering it temporarily individual to any calling block coupler to control the extension of the connection of the concerned calling line to a desired called line, supervisory means in each block coupler controllable from the called line to transmit a supervisory signal toward the calling line, means in the common control means for disabling the supervisory means of the block coupler with which it is currently associated, and means dependent on the identity of the called line for controlling said disabling means.

References Cited in the file of this patent

UNITED STATES PATENTS

| | | |
|---|---|---|
| 1,852,747 | Hague | Apr. 5, 1932 |
| 2,131,572 | Saunders | Sept. 27, 1938 |
| 2,200,820 | Boswau | May 14, 1940 |
| 2,279,822 | Henry et al. | Oct. 26, 1940 |
| 2,542,749 | Bruckart | Feb. 20, 1951 |